May 4, 1965    J. R. ROGERSON    3,181,263
LOBSTER TRAP DAVIT
Filed Sept. 20, 1963    2 Sheets-Sheet 1
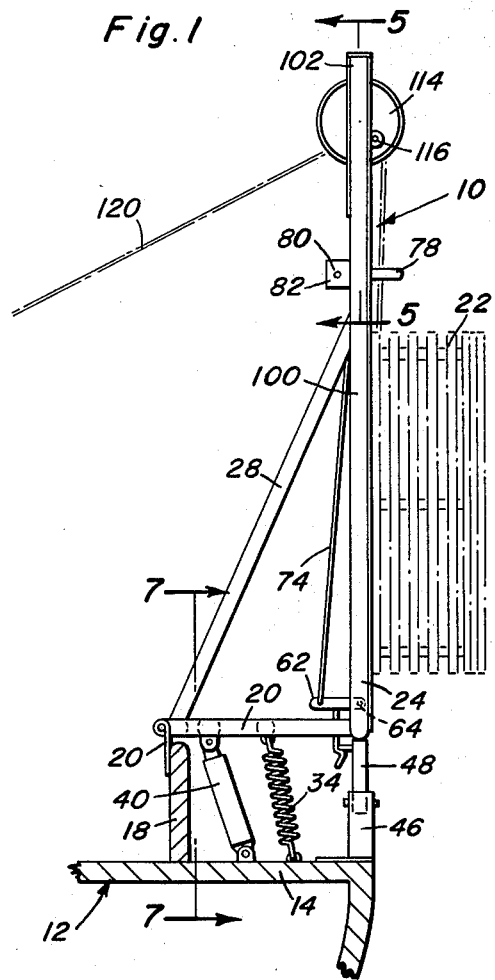
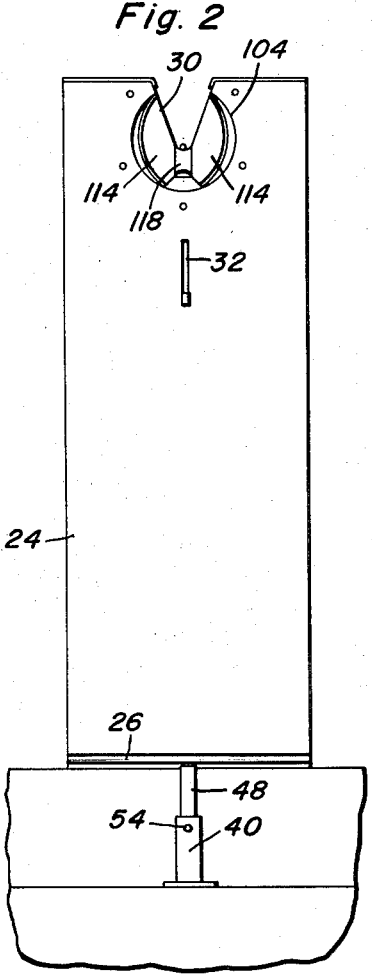
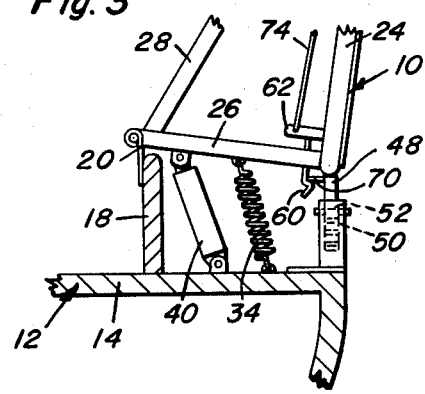
John R. Rogerson
INVENTOR.

May 4, 1965    J. R. ROGERSON    3,181,263
LOBSTER TRAP DAVIT
Filed Sept. 20, 1963    2 Sheets-Sheet 2
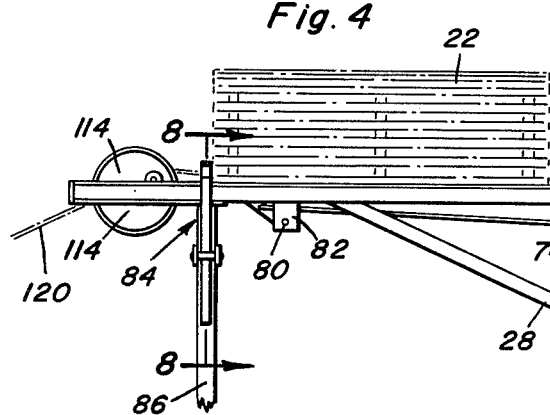
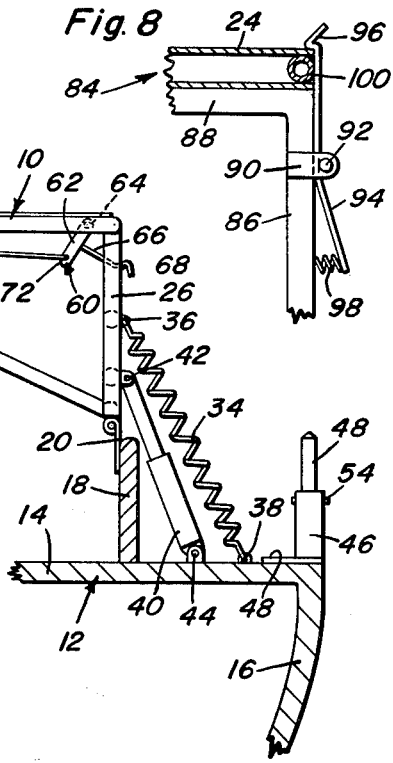
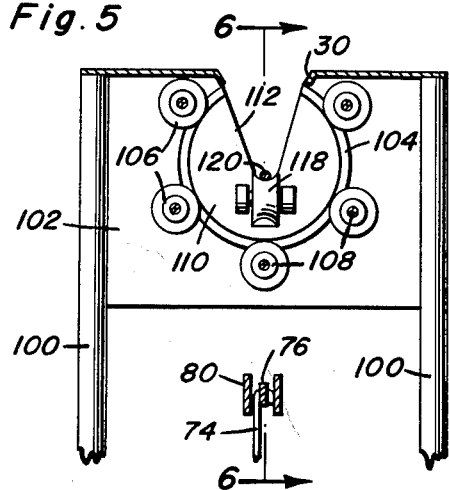
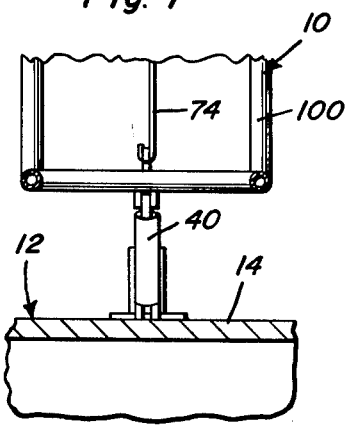
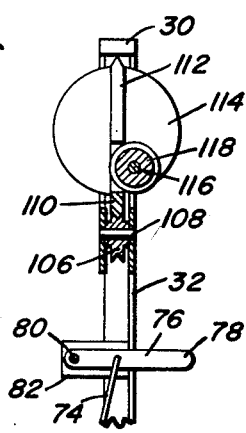
John R. Rogerson
INVENTOR.

United States Patent Office 3,181,263
Patented May 4, 1965

3,181,263
LOBSTER TRAP DAVIT
John R. Rogerson, Leonardville, New Brunswick, Canada
Filed Sept. 20, 1963, Ser. No. 310,360
8 Claims. (Cl. 43—8)

This invention comprises a novel and useful lobster trap davit and more particularly pertains to a catapult-type device to effect the hurling of a lobster trap from a support structure such as a boat or the like and which will function to effectively retrieve the lobster trap from the water.

The primary object of this invention is to provide a davit preferably of the catapult type which will greatly facilitate the hurling of lobster traps and similar articles from a boat or other platform and will facilitate the retrieving of such previously ejected articles.

A further object of the invention is to provide a device in accordance with the preceding object which shall be spring urged upon its ejecting movement.

Another object of the invention is to provide a device in accordance with the preceding objects which shall incorporate therein a shock absorber for cushioning the device and halting its movement as it approaches an erect position at the end of its movement upon its ejecting stroke.

A still further object of the invention is to provide apparatus in accordance with the preceding objects which shall include a pair of latch means respectively locking the device in each of its extreme positions of movement, thereby cocking the device in a horizontal position with its spring means under tension in readiness for ejecting a lobster trap upon its ejecting stroke and for releasably locking the device in its erect position upon completion of its ejecting stroke and in readiness for retrieval of a lobster trap which has been previously discharged.

Yet another purpose of the invention is to provide a device in conformity with the foregoing objects and which will automatically operate during the retrieving of the lobster trap for lifting the lobster trap from the water to the erected bed of the device, and upon successive movement of the lobster trap upon the bed to a predetermined position, automatically releasing the latch means which holds the device in its erect or retrieving position, and thereafter pivots the device from its erect to a horizontal position thereby tensioning the ejecting spring and positioning the device in readiness for its next ejecting operation.

Still another purpose of the invention is to provide a device in accordance with the preceding objects which shall include improved self-aligning guide means on the bed of the catapulting device to facilitate a straight line pull from a cable tensioning means during the retrieving of a lobster trap and during the subsequent cocking of the device in readiness for its next ejecting operation.

A still further object of the invention is to provide a catapult type of lobster trap ejecting device which shall include means providing a stop and cooperating with a latch to retain the lobster trap davit in a substantially erect ejecting and retrieving position at various adjustable angles with respect to the vertical plane.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in vertical elevation with parts of the support or mounting for the device being shown in vertical section and with the davit or catapult being shown in vertical position which is assumed at the end of its launching stroke and in readiness for retrieving a lobster trap thereon;

FIGURE 2 is an elevational view of the davit from the right end of FIGURE 1 but with the lobster trap and cable retrieving means being removed therefrom;

FIGURE 3 is a detailed view of the lower pivotal connection at the forward end of the device and showing the latch mechanism securing the bed of the device in an erect position but in a position of adjustment at a different vertical inclination from that of FIGURE 1;

FIGURE 4 is a view similar to FIGURE 1 but showing the device in its cocked position and in readiness for its next launching or ejecting operation;

FIGURE 5 is a detailed view taken upon an enlarged scale in a vertical transverse section taken substantially upon a plane indicated by the section line 5—5 of FIGURE 1 and showing in particular the self-aligning guide means of the lobster trap retrieving feature of the invention;

FIGURE 6 is a detailed view taken upon a further enlarged scale and in vertical transverse section substantially upon a plane indicated by the section line 6—6 of FIGURE 5;

FIGURE 7 is a detailed view taken upon an enlarged scale and in vertical transverse section substantially upon a plane indicated by the section line 7—7 of FIGURE 1; and FIGURE 8 is a still further detailed view taken upon an enlarged scale of a vertical transverse section substantially upon a plane indicated by the section line 8—8 of FIGURE 4 and showing the manual release latch of the invention.

The present invention relates to a davit of the catapult type specifically intended for the launching and retrieving of lobster traps although it may obviously be employed for the hurling and retrieving of other objects. Although shown applied to the hull of a boat, it will be appreciated that the device may be mounted upon a cabin or any other support means such as a platform on a dock, pier or the like or upon any other similar support structure. The catapulting davit indicated generally by the numeral 10 is shown mounted upon a support or mounting indicated generally at 12 which may comprise a horizontal surface 14 as of a boat or the like a portion of the hull of which is shown at 16. The mounting or support for the device includes an upstanding bracket as at 18 having any suitable form of pivot means such as a hinge 20 by which the device 10 is pivoted for vertical swinging movement between a substantially erect position shown in FIGURE 1 and a substantially horizontal position shown in FIGURE 4. The erect position is that assumed by the device when it has completed its lobster trap discharging or hurling operation, and is in position to retrieve a lobster trap as indicated in dotted lines in FIGURE 1, while the position shown in FIGURE 4 is its rest or cocked position in which the lobster trap 22 or other article to be hurled is shown in position thereon in readiness for being discharged or at the completion of its retrieval by the device as set forth hereinafter.

Referring now more specifically to FIGURES 1, 2 and 4, it will be seen that the davit or catapult 10 consists of a flat panel or bed 24 having a perpendicularly disposed foot member 26 which is rigidly braced to the bed as by the diagonal bracing element 28. The bed assembly thus consists of a triangular arrangement whose forward end is connected by the hinge 20 to the support element 18.

At what may be termed its rear end, the bed 24 has a V-shaped notch or opening 30 therein for purposes to be subsequently apparent and is further provided with a medially disposed longitudinally extending slot 32.

Inasmuch as the bed may be of any suitable construction a further description in this regard is deemed to be unnecessary for the purposes of this invention.

A resilient means in the form of a tension spring 34 has its opposite extremities secured as by eye bolts or other fasteners 36 to the foot member 26 of the bed and as by an eye bolt or other fastener 38 to the support member 14. This spring serves to yieldingly urge the bed from its horizontal cocked position of FIGURE 4 to its erect position of FIGURE 1. Also connected to the foot member 26 and to the support member 14 is a conventional type of a shock absorber or cushioning member 40. The shock absorber may conveniently comprise a hydraulic or pneumatic cylinder and piston unit which is terminally pivoted as at 42 to the foot member 26 and at 44 to the support member 14. The shock absorber is positioned between the connection of resilient means 34 to the foot member and the pivotal hinge 20 of the davit or catapult. The arrangement is such that the shock absorber is operative towards the end of the vertical upward swinging movement of the davit to cushion the movement of the davit into its final erect position of FIGURE 1 thereby reducing wear and breakage of the davit or its stop means and latch means.

Further mounted upon the support member 14 is an adjustable stop means in the form of an outer cylinder 46 having a foot plate 40 by which it is fixedly secured to the support member 14. Longitudinally adjustably received within the cylinder 46 is an upwardly projecting piston or pin 48 with a longitudinally spaced series of apertures as at 50 therein adapted to selectively register with a corresponding bore 52 in the cylindrical member 46 and to be retained in adjusted position as by a pin 54. In this manner, by adjusting the vertical extension of the plunger or pin 48 in the cylinder 46 of the stop means, the bottom surface of the foot member 26 of the davit 10 can be engaged in different positions thereby to adjustably tilt the davit in various positions in which it is inclined to the vertical plane as will be seen by comparison of FIGURES 1 and 3. In this manner the bed can be stopped in a substantially vertical position, as shown in FIGURE 1 or a forwardly inclined position as shown in FIGURE 3 or even a rearwardly inclined position, not shown, by appropriate adjustment of the stop means. This enables a very satisfactory adjustment of the range of action and direction and extent of the ejecting operation of a lobster davit device.

The invention further comprehends the provision of a pair of latch means. Thus, there is provided a first latch means indicated generally by the numeral 60 and which serves to releasably retain the bed in its erect position. The first latch means includes a lever 62 pivotally connected to the bed as at 64 adjacent the forward end of the bed. The lever has mounted thereon a latch finger 66 of a resilient nature having a terminal detent portion 68 of a C-shaped configuration which is adapted to pass over and resiliently engage beneath a laterally extending keeper pin 70 secured to the adjustable stop member 48. The connection of the latch finger 66 to the lever 62 is perforated at its mid portion and in the arm of this lever as at 72 there is pivotally connected the end of a latch pull rod or link 74. The other end of this latter member, as shown best in FIGURE 6, is pivoted at the mid portion of a lever 76 comprising an actuator for the latch. The actuating end 78 of the actuator 76 extends through the previously mentioned slot 32 in the bed 24 while the other end of the actuator latch is pivoted as at 80 to a support bracket 82 secured to what may be termed the rear face of the bed 24, that is, the lower side of the bed when the latter is in its horizontal position shown in FIGURE 4.

The arrangement is such that as the bed is moved into erect position, the latch finger will automatically pass over and be resiliently deflected as it passes over the keeper 70 until it reaches the latching engagement therebeneath as shown in FIGURES 1 and 3. However, when the latch actuator lever 78 is moved from the front towards the rear of the bed, or upwardly as viewed in FIGURE 6 and in a manner to be subsequently set forth, the latch will be released thereby permitting the bed of the device to move from its erect position to its horizontal position against the resistance of the spring 34 as set forth hereinafter.

The second latch means indicated generally by the numeral 84, consists of an L-shaped bracket 86, see FIGURES 4 and 8 in particular, which rises from the support bed in any suitable position thereon, and includes the horizontal transverse arm 88 which underlies and receives thereon the bed 24 when the latter is in this horizontal position. A latch bracket 90 is secured to the support 86 and by means of a pivot 92 carries a latch lever 94 having a latching terminal 96 thereon adapted to overlie the side of the bed 24, being retained in this position by a spring means 98 disposed between the other end of the latch lever 94 and the support 86. The configuration of the hook or terminal portion 96 of the latch is such that as the bed is moved downward to its horizontal position, the edge of the bed will engage this terminal portion and with a camming action on the camming surface thereof will pivot the latch 94 in a clockwise direction about its pivot 92 against the resistance of the spring 98 so that the latch spring will engage over the bed and thus retain the latter in its horizontal or cocked position, the spring 34 being under tension at this time as will be apparent from FIGURE 4.

When it is desired to release the second latch 84 and permit the spring 34 to move the bed on its ejecting stroke, it is merely necessary to depress the lever 94 manually against the spring 98 thereby withdrawing the latching hook or terminal 96 from its engagement with the bed 24. The spring 34 will then pivot the bed in a clockwise direction about its pivot 20, the shock absorber 40 cushioning the bed as the latter approaches its erect or final position, so that when the bed is engaged with the stop means 48, the first latch means 60 will engage the keeper 70 and thus retain the latch in its erect position.

At its rear end, the davit 10 is provided with a guide means cooperating with the slot 30. Referring now to FIGURES 2, 5 and 6 in particular, it will be seen that the side frame members 100 of the davit bed are provided at their rearmost ends with a transversely extending plate 102 provided with a circular opening 104 therethrough. Supporting rollers in the form of pulleys 106 and carried by pivots 108 are mounted upon the base plate 102 and surrounds the opening 104 to journal therebetween a turntable or carrier plate 110 of a circular configuration. The plate is likewise provided with a V-shaped notch 112 adapted to register with the V-shaped notch opening 30 in the upper end of the bed. However, the plate is rotatable with respect to the notch 30 as will now be apparent. The opposite sides of the plate are provided with diverging disks 114 projecting from both the front and back of the base plate 102 and the bed 24 to thereby provide guiding members. Journaled between the guide plates 114 and inwardly of the center of the carrier plate 110 and to one side thereof as shown in FIGURE 6 as by a shaft or axle 116 is a guide pulley 118. A tensionable member in the form of a cable 120 extends from any suitable power source such as a power operated winch or hand winch or the like, is passed through the slots 30 and 112 and entrained over the guide pulley 118 mounted upon the turntable or carrier plate 110 and from thence passes across what may be termed the forward face of the bed of the device. This cable is adapted to be connected to a lobster trap or other article when it is desirable to reprieve the same from the water. The cable serves both as a retrieving means for the lobster trap to recover it from the water and reposition it upon the davit and also as a means to move the davit from its erect position to its cocked position.

This operation is automatic and is as follows.

With the device in its erect position as shown in FIGURE 1 the end of the cable is attached to a lobster trap which is to be recovered. The cable is then reeled in lifting the lobster trap upon the bed 24 into the position shown in FIGURE 1. The lobster trap is moved upward, towards the end of its upward travel, engaging the actuator 78 and thus automatically releases the first latch means 60. Although the spring 34 is retaining the davit in its erect position, the davit is now free to swing in a counter-clockwise direction as the pull of the cable upon the lobster trap continues. When the lobster trap reaches the adjacent surfaces of the guide disks 114, the pull of the cables now transfers the lobster trap directly to the upper end or rear end of the bed and the cable now serves to move the bed to its horizontal position tensioning the return spring 34. As the bed completes its movement to its horizontal position, the second latch means 84 automatically engages and retains the bed in this position. Thereupon, the lobster trap can be removed, replaced with a new lobster trap, and by manual release of the latch 86 with the cable 129 disconnected from the new lobster trap, the device is free to eject the lobster trap.

As previously mentioned, the stop means consisting of the numerals 46, 48 is adjusted to cause the bed of the davit to stop in a desired inclined position with respect to the vertical depending upon the particular circumstances of the desired ejection of the lobster trap therefrom.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A davit for lobster traps and the like comprising a bed, a support, means mounting said bed at the forward end thereof upon said support for vertical swinging movement between a rearwardly extending horizontal position and an erect position, resilient means connected to said bed and support and biasing said bed toward its erect position, a latch means detachably connected to said support and bed and releasably retaining said bed in its erect position, release means connected to said latch means and including an actuator carried by and projecting from said bed in a position for actuation by a lobster trap when moved into predetermined position upon said bed when the latter is in its erect position whereby said bed may then be moved from its erect to its horizontal position.

2. The combination of claim 1 including a cushioning means connected to said bed and support and operable to cushion and stop the final portion of the movement of said bed under the bias of said resilient means from the horizontal to the erect position.

3. The combination of claim 1 including a second latch means connected to said bed and support and retaining said bed in its horizontal position against the bias of said resilient means and manually operable release means connected to said second latch means.

4. The combination of claim 1 including guide means upon said bed at its other end remote from said mounting means, a power operated flexible tensioning element engaging said guide means whereby tensioning of said tensioning element when connected to a lobster trap will retrieve the latter and pull the trap upon the bed and from the forward end thereof toward the rear end.

5. The combination of claim 4 including a carriage rotatably journaled upon said bed at said rear end for rotation about an axis perpendicular to the plane of the bed, said guide means being mounted upon said carriage.

6. The combination of claim 1 including an adjustable stop means adjusting the inclination to the horizontal plane of the bed in its erect position.

7. The combination of claim 1 wherein said bed has an opening at its rearward end, a carriage disposed in the plane of the bed and journaled in said bed and disposed in said opening, registerable slots in said bed and carriage, a guide pulley journaled upon said carriage and within said carriage slot, a cable entrained over said pulley and through said slots for connection to a lobster trap and operable upon initial tensioning for drawing the trap upon the bed when the latter is in its erect position, said cable operable upon further tensioning for urging the lobster trap against said actuator and thereby releasing said latch means, said cable being operable upon final tensioning to move the lobster trap to a final rearward position upon said bed and thereafter pivot said bed against the resistance of said resilient means to its horizontal rearwardly extending position.

8. The combination of claim 7 including guide plates secured to said carriage on both sides of said carriage slot and extending from both front and back faces of said bed.

References Cited by the Examiner

UNITED STATES PATENTS

| | | | |
|---|---|---|---|
| 202,301 | 4/78 | Taltavull | 124—7 |
| 2,732,647 | 1/56 | Byars | 43—8 |
| 2,891,342 | 6/59 | Grable et al. | 43—8 |

ABRAHAM G. STONE, *Primary Examiner.*

F. RAY CHAPPELL, *Examiner.*